3,025,138
MANUFACTURE OF BORON TRICHLORIDE
Robert G. Davis, Peekskill, Jerome N. Haimsohn, Ardsley, and Joseph T. Bashour, New York, N.Y., assignors to Stauffer Chemical Company, a corporation of Delaware
No Drawing. Filed Apr. 15, 1957, Ser. No. 652,659
6 Claims. (Cl. 23—205)

This invention relates to the manufacture of boron trichloride and, more particularly, relates to the manufacture of boron trichloride in a continuous process in a fluidized bed utilizing boron carbide as the boron-containing raw material.

Boron trichloride has been made in the past by the chlorination of boron carbide by a batch process in fixed bed furnaces. Aside from the inherent disadvantages of batch fixed bed processes, there is an added problem in this system arising from the boron oxide impurity found in commercial grades of boron carbide. The boron oxide, which is a molten liquid at chlorination temperature, flows onto and over the surfaces of the boron carbide charge, impeding the reaction and resulting in serious inefficiency in the utilization of the expensive boron carbide. In the past, it has been proposed to utilize briquettes of carbon containing the boron compound, wherein the carbon is in large excess, acting as an adsorbent for the liquid boron oxide.

In the past, it has not been feasible to chlorinate boron carbide in a conventional fluidized bed, because of the boric oxide normally found in commercial boron carbide (at times in concentrations of over 6%). The molten oxide causes collapse of the fluid bed at chlorination temperatures by agglomerating the fluidized particles, and concentrations as low as from 3.7% to 4% can cause this difficulty at high fluidizing gas velocities and at lower velocities even lower percentages of oxide impair fluidity.

In accordance with the present invention, it has been found that boron carbide can be chlorinated in a fluidized bed by first establishing a preheated fluidized bed containing a large excess of solid carbonaceous reducing agent, and then feeding thereto boron carbide and chlorine. Temperatures of from 600° C. to 1200° C. are suitable but a range of 700° C. to 1100° C. is preferred. The use of carbon in large excess in the bed not only preserves bed fluidity, but also makes available a large excess of reducing agent for the reduction-chlorination of the boron oxide, thereby preventing its build-up in the bed. The adsorptive capacity of the diluent is an important factor in establishing the tolerance level of the boron oxide with respect to maintaining good bed fluidity. In this connection, for example, activated charcoal is better than calcined petroleum coke. As has been pointed out previously, the use of carbon in the bed is not necessary if the amount of boron oxide in the boron carbide is less than about 3.7%; however, the amount of carbon required goes up quite rapidly as the amount of boron oxide in the bed increases. Thus, with hard wood charcoal, the maximum amount of boron oxide which can be tolerated in the bed is about 13% to 15%, with activated cocoanut charcoal about 12% to 14%, and with calcined petroleum coke about 6% to 9%. Thus, the present invention contemplates operation with a maximum of about 15% of boron oxide in the total bed composition, the balance of the bed being made up of carbon and boron carbide.

In putting a reactor on stream, a bed is first preferably made of carbon, and after this is brought to the desired reaction temperature the solid and gaseous feed materials are introduced into the bed. The gaseous feed rate is adjusted to attain the desired superfinal velocity at the given operating temperature to maintain the bed in a well-fluidized state. The solids reactant feed rate is then normally adjusted to a rate not to exceed the stoichiometric equivalent of the chlorine in the gaseous feed. The solids feed rate will be further adjusted so that the bed composition does not contain over 15% of the oxide at any time. Preferably, the concentration will be kept below this value and the amount of carbon in the bed will not be less than about 25%.

The solid carbonaceous reducing agent which is employed may be activated charcoal, calcined petroleum coke, or other finely divided source of free carbon. The boron carbide and the carbon are both finely divided, e.g., −10 to +200 mesh. One may use −200 to −325 mesh material by conveying these finely divided feed materials into the reactor in the chlorine gas stream. Ordinarily, the chlorine gas is fed into the reactor at operating conditions of 0.1 to 3 feet per second, to maintain the bed in a fluidized condition. Generally speaking, it is preferred to employ stoichiometric quantities of boron (in the solids feed) and chlorine, but substantial departures from the exact ratio may be made, as is shown in the examples.

The reaction is highly exothermic and is normally self-sustaining and, in reactors of conventional size, some means must be provided for removing excess heat so that temperatures can be maintained at reasonable levels. The requirements for this in a fluid bed operation are in marked contrast to a fixed bed system. In a fluidized reactor characterized by (a) high process efficiencies, (b) high productivity per unit reactor volume, and (c) excellent radial temperature distribution, it is essential that efficient means of heat removal must be provided. The fixed bed reactors, however, have poor radial temperature distribution, coupled with lower efficiencies and lower productivity per unit reactor volume. Cooling, therefore, of fixed bed systems, in the past, has presented no problems. Excessive temperatures, along with the scouring action of the fluidized particles, accelerate the deterioration of the refractory linings of fluid bed reactors. For the purpose of heat removal, one may feed into the reactor liquid or vaporous boron trichloride. Other inert liquids or vapors, such as titanium or silicon chlorides, may also be used for this purpose. Alternatively cooling coils of suitable materials of construction may be submerged within the fluid bed, and the aforementioned inert metal chlorides or liquid chlorine used therein as refrigerants.

As has been mentioned above, commercial boron carbide contains an appreciable amount of boron oxide. Since the reaction between chlorine and boron carbide is exothermic, while the reaction between boron oxide, carbon and chlorine is endothermic, the presence of the boron oxide does serve to remove excess heat from the reactor and, in fact, boron oxide may be added to the charge in sufficient quantity to wholly or partially maintain the desired temperature conditions of the reactor. Of course, the exact amount added will depend upon the reactor design, operating temperature, process efficiency and the like, as well as the presence or absence of other coolants. However, it has been found that under some conditions as much as 3.33 pounds of boron oxide may be employed for each pound of boron carbide. When boron oxide is used as a portion of the feed material, a stoichiometric quantity of carbon must be fed along with it, taking into account, however, the excess carbon left behind as the carbide reacts, as well as free carbon which ordinarily exists in commercial boron carbide.

The excess carbon, derived from the carbide and which can accumulate in the bed, is removed from the reactor by combustion with air or oxygen fed continuously or intermittently with the chlorine. Alternatively, it may be removed by a periodic withdrawal of solids from the reactor. Some of the excess carbon derived from the carbide is carried off mechanically by elutriation in the product gas stream. Of course, if a large portion of the oxide is used in the feed, the carbon will be consumed in reducing the oxide.

The following non-limiting examples illustrate the process.

*Example 1.*—The reaction was carried out in a 4" I.D. quartz tube reactor. The product gas was filtered and condensed in appropriate equipment.

An initial charge of 1800 gms. of calcined petroleum coke and 200 gms. of boron carbide was preheated to 800° C. by external natural gas burners while fluidized by an inert gas (nitrogen). The calcined coke used was chemically 98+% carbon and sized in particles passing through 40 mesh and retained on 200 U.S. screens. The boron carbide was chemically 86% boron carbide, 8% excess carbon, and 6% boric oxide and sized in particles passing through 40 mesh and retained on 200 mesh U.S. screens.

The reaction was carried out with the temperature held at 800° C. The feeds were 8.3 gms./min. of the above-mentioned boron carbide, 56.0 gms./min. of gaseous chlorine, and 0.9 gms./min. of oxygen. The run was terminated as scheduled after three hours. Boron carbide and chlorine conversions to the product, boron trichloride, were 97% of the amounts fed. No significant quantity of boric oxide was retained in the fluidized solids bed. A total of 106 grams of $B_2O_3$ was contained in the boron carbide feed, and an additional 12 grams was present in the initial bed charge. Only 37 grams of boron oxide remained in the bed at the completion of the run. The final bed composition was about 2% $B_2O_3$, 2.5% $B_4C$, and the remainder coke. The oxygen feed served the purpose of keeping the quantity of carbon constant in the fluid bed. The reaction was highly exothermic.

*Example 2.*—The process of Example 1 was repeated using the same chemically constituted raw materials, except that no oxygen was introduced with the chlorine. Instead, an overflow tube was provided for the continuous withdrawal of excess solids (principally carbon), to prevent accumulation in the bed. The overflow tube was located at a point 18" above the bottom of the fluidized bed. The run conditions and results are summarized as follows:

Initial bed—1700 gms. petroleum coke (—40 +200 mesh); 350 gms. boron carbide (—40 +200 mesh).
Reaction temperature 800° C.
Feed material—boron carbide (—20 +40 mesh).
Solids feed rate—8.1 gms./min.
Chlorine feed rate—38.6 gms./min.
Solids withdrawal rate—2.2 gms./min. (average composition 21% boron carbide).
Solids elutriation rate—1.0 gm./min.
Duration of run—three hours.
Chlorine conversion—97+%.
Initial boron carbide concentration in bed—17%.
Final boron carbide concentration in bed—25%.

*Example 3.*—The process of Example 1 was repeated again using the same chemically constituted raw materials. No solids overflow or oxygen burn-off was provided in this run to remove excess carbon. The run conditions and results are summarized as follows:

Initial bed—1620 gms. petroleum coke (—40 +200 mesh), 180 gms. boron carbide (—60 mesh).
Reaction temperature—710° C.
Feed material—boron carbide (—60 mesh).
Solids feed rate—4.0 gms./min.
Chlorine feed rate—43.5 gms./min.
Duration of run—3 hours.
Chlorine conversion—45%.
Initial boron carbide concentration in bed—10%.
Final boron carbide concentration in bed—19%.
$B_2O_3$ in total boron carbide feed—43 gms.
$B_2O_3$ in initial bed—11 gms.
$B_2O_3$ in final bed—31 gms.

It should be noted that the concentration of boron carbide increased while the boron carbide feed rate was held at considerably less than the stoichiometric requirement of the chlorine feed. The reduced reaction rate at the lower temperature of this run is considerable.

*Example 4.*—The reaction was carried out in a 10 ft. high, 26.5" I.D. reactor, lined with nine inches of refractory brick and 13.5 inches of insulating brick, all in a steel shell. The product gas was recovered in appropriate equipment, after leaving the reactor through an outlet located five feet from the top.

The reactor was preheated with natural gas burners for a period of twenty-four hours, after which time charcoal was added to the reactor and burned with a stream of air fed into the bottom gas inlets. Calcined petroleum coke was then introduced into the reactor continuously and maintained in a fluidized state with air. The coke fire was maintained for twenty-four hours after the temperature of the unit leveled off at about 1000° C. At this point, the air and coke feeds were stopped. The quantity of coke in the bed was about 700 pounds. The air was then purged from the reactor by passing in sufficient nitrogen. The continuous feeding of reactants (gas and solids) was then started. Nitrogen flow was gradually reduced as the chlorine-boron trichloride mixture was introduced to maintain fluidization. Boron trichloride vapor was fed into the reactor continuously with the chlorine stream, for the purpose of removing excess heat. No solids overflow or oxygen burn-off was provided to remove the excess carbon. The run conditions and results are summarized as follows:

Initial bed—700 pounds petroleum coke (98+% carbon, sized as —40 +200 mesh).
Reaction temperature—1000° C.
Feed material—boron carbide (90% $B_4C$, 5% $B_2O_3$, 5% carbon, sized as —40 +200 mesh).
Solids feed rate—0.28 pound/min.
Chlorine feed rate—2.02 lbs./min.
Boron trichloride feed rate—6.15 lbs./min.
Duration of run—24 hours.
Chlorine conversion—96%.
$B_2O_3$ in total boron carbide feed—20.2 lbs.
$B_2O_3$ in final bed—4.1 lbs.
Final boron carbide concentration in bed—1.4%.

*Example 5.*—The process of Example 4 was repeated except that liquid titanium tetrachloride was sprayed into the reactor for the purpose of removing excess heat. The run conditions and results are summarized as follows:

Initial bed—700 lbs. petroleum coke (98+% carbon, sized as —40 +200 mesh).
Solids feed rate—0.40 lb./min.
Chlorine feed rate—2.88 lbs./min.
Titanium tetrachloride feed rate—8.65 lbs./min.
Duration of run—24 hours.
Chlorine conversion—93%.
$B_2O_3$ in total boron carbide feed—28.8 lbs.
$B_2O_3$ in final bed—5.3 lbs.
Final boron carbide concentration in bed—1.6%.

*Example 6.*—The process of Example 4 was modified to include in the solids feed a mixture of boron oxide and carbon, along with the boron carbide, in proportions necessary to absorb the exothermic heat of the boron carbide chlorination reaction. The boron oxide used was 97% pure and sized as —20 mesh particles. The run condtiions and results are as follows:

Initial bed—713 lbs. petroleum coke (—40 +200 mesh).
Reaction temperature—1000° C.
Feed material—A mixture containing on a pure component basis: 16.3% boron carbide, 54.3% boric oxide, 27.8% carbon and 1.6% miscellaneous (particles generally sized as —20 mesh).
Solids feed rate—1.98 lbs./min.
Chlorine feed rate—5.77 lbs./min.

Duration of run—12 hours.
Chlorine conversion—92+%.
Final boron carbide concentration in bed—1.1%.
Final boric oxide concentration in bed—0.8%.

*Example 7.*—The process of Example 6 was repeated except that a lesser proportion of boron oxide and carbon in the solids feed was used, and boron trichloride vapor was introduced with the chlorine to remove the remaining excess heat. The run conditions and results are summarized as follows:

Initial bed—705 lbs. petroleum coke (—40 +200 mesh).
Reaction temperature—1000° C.
Feed material—A mixture containing on a pure component basis: 28.7% boron carbide, 47.1% boric oxide, 24.2% carbon (particles generally sized —20 mesh).
Solids feed rate—0.78 lb./min.
Chlorine feed rate—2.85 lbs./min.
Boron trichloride feed rate—3.97 lbs./min.
Duration of run—24 hours.
Chlorine conversion—96%.
Final boron carbide concentration in bed—1.4%.
Final boric oxide concentration in bed—1.2%.

We claim:
1. The process of producing boron trichloride from boron carbide wherein said boron carbide contains at least 0.037 pound and substantially less than 3.33 pounds of boron oxide per pound of boron carbide comprising forming a preheated fluidized bed of a solid adsorbent carbonaceous reducing agent and feeding said boron carbide into said bed at an elevated temperature, the rate of the addition being such that the concentration of boron oxide in the bed does not rise above about 9%, passing chlorine through said bed and providing cooling means in said bed whereby there is formed boron trichloride and recovering said boron trichloride from said bed.

2. The process of claim 1 wherein the temperature is maintained at from 600° C. to 1200° C.

3. The process of claim 1 wherein solid carbon is formed in the said bed by reduction of said boron carbide and wherein said solid carbon is withdrawn from the bed while the reaction is being conducted, said carbon being withdrawn at about the rate of formation thereof by reduction of said boron carbide.

4. The process of claim 1 wherein solid carbon is formed by reduction of said boron carbide and wherein oxygen is fed into the bed in conjunction with chlorine, said oxygen serving to react with said solid carbon so formed whereby to remove the said solid carbon from said bed.

5. The process of claim 1 wherein a metal chloride is fed into the bed to cool the bed.

6. The process of claim 1 wherein the amount of solid carbonaceous reducing agent in the bed does not fall below 25%.

References Cited in the file of this patent

UNITED STATES PATENTS

| | | |
|---|---|---|
| 2,097,482 | Weber et al. | Nov. 2, 1937 |
| 2,369,212 | Cooper | Feb. 13, 1945 |
| 2,369,214 | Cooper | Feb. 13, 1945 |
| 2,412,667 | Arveson | Dec. 17, 1946 |
| 2,455,419 | Johnson | Dec. 7, 1948 |
| 2,674,612 | Murphree | Apr. 6, 1954 |
| 2,758,021 | Drapeau et al. | Aug. 7, 1956 |

OTHER REFERENCES

Chem. Abstract, 33, 7055 (1929).